Figure 1:
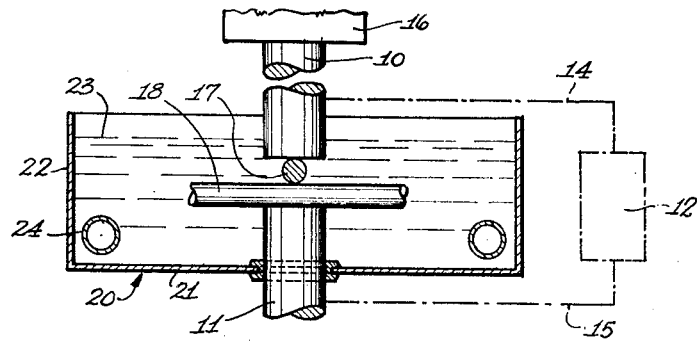

July 20, 1965    G. R. PIERCY ETAL    3,196,247
METHOD AND APPARATUS FOR WELDING ALUMINUM
Filed Dec. 20, 1962

INVENTOR
George R. Piercy
James A. E. Bell
BY Harold G. Weir
PATENT AGENT

United States Patent Office 3,196,247
Patented July 20, 1965

3,196,247
METHOD AND APPARATUS FOR WELDING ALUMINUM
George R. Piercy, Deep River, Ontario, and James A. E. Bell, Toronto, Ontario, Canada, assignors to Atomic Energy of Canada Limited, Ottawa, Ontario, Canada, a company
Filed Dec. 20, 1962, Ser. No. 246,094
3 Claims. (Cl. 219—72)

This invention relates to the resistance welding of aluminum and its alloys, and in particular it relates to a method and apparatus for maintaining at least the areas where welding is to be effected clean and free from oxide during the welding process.

It is well known that in the welding of aluminum and the like, the surfaces where welding is to be effected should be clean and free from oxide. In the prior art it is known to clean and deoxidize the surfaces, but it is often difficult to maintain the surfaces free from oxide until the welding is completed.

Hereinafter, when reference is made to aluminum, it is intended that aluminum alloys be included. When reference is intended to aluminum only it will be referred to as pure aluminum, that is, not including alloys.

In the past it has been customary to immerse the part or article to be welded, that is the workpiece of aluminum, in a chemical etchant or cleaner prior to welding. This removes any grease or dirt present on the surface and also removes the layer of oxide from the aluminum surface. The aluminum workpiece may then be removed from the etchant for welding. However, difficulties are sometimes encountered because the aluminum surface, once it is removed from the etchant, and exposed to the atmosphere, oxidizes relatively quickly. Thus, the welding of the workpiece should not be delayed once it is removed from the etching solution.

It is an object of the invention to overcome the difficulties in the prior art by providing an improved method for welding aluminum and the like, and apparatus therefor, which maintains the surfaces to be welded free from oxide prior to and during the welding process.

It is another object of the invention to provide a method for welding aluminum and the like in which the oxide is removed from the surface of an aluminum workpiece to be welded and the welding operation is performed in one location.

It is another object of the invention to provide an improved apparatus of novel design for effectively cleaning and welding aluminum surfaces kept free of oxide.

Briefly, the present invention provides a body or bath of etching solution in the welding area between the electrodes of a resistance welder. Aluminum workpieces having portions to be welded are positioned between the electrodes with the surfaces of the portions to be welded, immersed. The solution removes the layer of oxide from these surfaces. The workpieces are gripped between the electrodes and a pulse of welding current is passed between the electrodes while the portions are still immersed.

It is intended that "aluminum workpieces" should include both a single member of aluminum which may be formed in such a manner as to have at least two portions to be welded together, and two or more aluminum members having portions to be welded together.

Figure 2:
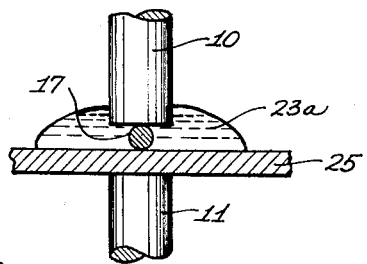
Figure 4:
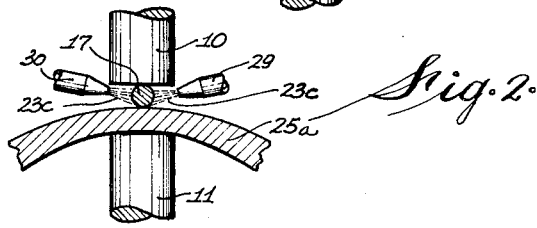
Figure 3:
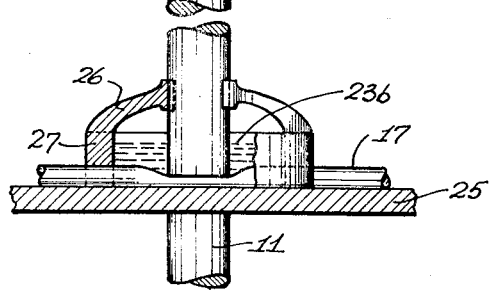

The invention will be described in more detail with reference to the accompanying drawings, in which FIGURE 1 is a schematic side view, partly in section, of a portion of a resistance welder showing the electrodes thereof and some associated parts, in accordance with one form of the invention, and FIGURES 2, 3 and 4 are schematic views, partly in section, showing electrodes of a resistance welder, illustrating other forms of the invention.

Referring now to FIGURE 1, a pair of welding electrodes 10 and 11 are shown connected to a source of welding current 12 (indicated in phantom) by conductors 14 and 15 (also in phantom). The electrode 10 is a movable electrode and the electrode 11 is a fixed electrode. That is, electrode 10 is carried in an electrode holder 16 that is part of a piston or the like (not shown) which is adapted to move towards and away from the opposing electrode 11. This arrangement is well known in resistance welders. It enables the electrodes to be separated to receive workpieces having portions to be welded, and then to be moved towards one another selectively, i.e., when required, to grip the workpieces. In FIGURE 1 the workpieces are shown as two cylindrically shaped or wire-like aluminum members 17 and 18 crossing one another. The members 17 and 18 are gripped between electrodes 10 and 11 so that they are pressed together prior to a pulse of welding current being passed therethrough.

In accordance with the invention as shown in FIGURE 1, a liquid container 20 having a bottom 21 and side walls 22 is mounted to electrode 11 so that electrode 11 projects through bottom 21 into container 20. The container 20 is of a size to receive the workpieces or to receive that part of the workpieces to be welded with container walls 21 extending upwards above the welding area. Thus the container 20 may hold an etching solution 23 with the surface of solution 23 above the portions of members 17 and 18 which are to be welded together. The etching solution 23 may be of any known and commercially available solutions suitable for removing an oxide layer from a surface of aluminum.

In the operation of the apparatus of FIGURE 1, the electrode 10 is moved away from electrode 11, the workpiece comprising members 17 and 18 is positioned between the electrodes immersed in the etching solution 23, and the electrode 10 is moved towards electrode 11 to grip the workpieces and press the members 17 and 18 toegther between the electrodes. A pulse of welding current is then passed through the workpieces to weld members 17 and 18 together while immersed.

As a particular example, apparatus of the form of the invention shown in FIGURE 1 has been used to weld two pure aluminum wires of a diameter of 0.015 inch. The electrodes 10 and 11 were of copper, and the etching solution was a solution of fifty weight-percent NaOH in water at 50° C. In this particular example the two wire members were pressed together until the electrode separation was 0.017 inch and the pulse of weld current comprised a preliminary discharge at half predetermined power followed by discharge at the full predetermined power.

It will, of course, be apparent that the values in the preceding example may all vary to a great extent depending on the size, shape and type of material being welded. With a larger or harder material it may be desirable to use a constant pressure on the material rather than a predetermined electrode gap; it may be desirable to use a different strength of etching solution or a different type; or it may be desirable to have the etching solution at a different temperature. Selection of suitable values should present no problem to one skilled in the art.

As was previously mentioned, it may be desirable to select the temperature of the etching solution. That is, in some instances, depending on the solution and the time available, the oxide layer may be removed more rapidly if the etching solution is heated. This may be accomplished as shown in FIGURE 1, by a heating coil 24 within container 20 immersed in solution 23. The coil 24 may carry a heating fluid or it may contain an electric heating element or other known means for heating a solution.

Referring now to FIGURE 2, there is shown the electrodes 10 and 11 of a resistance welder, as before, with workpieces between the electrodes which comprise a wire-like aluminum member 17 and a flat aluminum plate or sheet 25. A puddle of etching solution 23a is placed around the portions of the workpieces to be welded so that the surfaces of the portions to be welded are immersed in the solution. The solution removes the oxide layer and maintains it free of oxide until the welding is completed.

If difficulty is encountered in retaining the puddle of etching solution in the weld area as in FIGURE 2, and this will depend to an extent on the sizes of the members entering the solution and the solution itself, then the apparatus of FIGURE 3 may be used.

Referring now to FIGURE 3, the movable and fixed electrodes 10 and 11 are shown with workpieces between them which are shown as a wire-like member 17 and a flat plate 25. A plurality of electrically insulating arms 26 are fastened at one end to electrode 10, extending outwards and downwards to support a container ring 27. If required, the arms 26 may be flexible as will be mentioned hereinafter. The container ring 27 encircles the electrode 10 and may be of the same or different material than arms 26. All that is required is that the ring 27 be electrically insulated from electrode 10, and the bottom surface thereof make a reasonably good liquid retaining engagement around the portions of the workpiece to be welded. In FIGURE 3 the bottom surface of ring 27 is resilient to accommodate member 17 passing between ring 27 and plate 25. The ring 27 with plate 25 forms a container to hold an etching solution 23b.

When the apparatus of FIGURE 3 is used, the workpiece is positioned between the electrodes, electrode 10 with ring 27 is lowered until ring 27 makes relatively good liquid-retaining engagement with plate 25 and member 17, and an etching solution 23b is added within the container formed by container ring 27. The etching solution removes the oxide layer from the surface of the portions of the workpieces to be welded and, of course, prevents another oxide layer forming. It may be that the electrode 10 must be lowered a further distance to engage the workpiece and press the member 17 and plate 25 together with the necessary pressure for welding. If so, arms 26 should be flexible to permit this further movement. When the required pressure is achieved the pulse of welding current is passed through the workpieces as before.

It will be apparent that if the member 17, whatever its shape, is of a size to fit within ring 27, then the bottom of ring 27 need not be resilient, provided, of course, that the liquid can be retained for a length of time to accomplish the welding.

It may be required to weld a wire-like aluminum member to a curved aluminum plate. Depending on the curvature of the plate, among other things, the etching solution may not form a puddle as in FIGURE 2 but may tend to run off. The arrangement of FIGURE 3 might be used to weld such members if ring 27 could be formed to or could conform itself to fit the curvature of the plate and could provide with the plate a container of sufficient depth to cover the weld surfaces with etching solution. However, it may be more convenient to use the arrangement of FIGURE 4.

Referring now to FIGURE 4, the electrodes 10 and 11 are shown as before with workpieces therebetween which are shown as a wire-like aluminum member 17 and a curved aluminum plate 25a. Two nozzles or jets 29 and 30 are positioned adjacent the workpiece and directed towards the weld surfaces. The jets are adapted to direct a stream of etching solution 23c at the weld area. The stream of etching solution 23c flows continuously during a period of time prior to welding and until welding is completed. The stream, in effect, provides a bath of etching solution which maintains the surfaces to be welded immersed to remove the oxide coating and prevent further oxide formation until welding is completed.

It will be seen that this invention provides a simple method and apparatus for resistance welding aluminum in which the oxide layer is removed from the surface of the portions to be welded and is kept free of oxide during the welding process.

We claim:

1. A method for resistance welding aluminum and aluminum alloys comprising immersing the welding surfaces of aluminum objects having an aluminum oxide film thereon in an etching solution to remove the oxide from the welding surfaces, maintaining the surfaces immersed to prevent further oxidation, pressing the surfaces together, and passing a welding current across the surfaces.

2. A method for welding objects of aluminum and aluminum alloys at predetermined surface portions thereof with a resistance welder having a pair of welding electrodes comprising immersing the surface portions of the aluminum objects having an aluminum oxide film thereon in an etching solution to deoxidize the said surface portions, pressing the said surface portions together between the said welding electrodes while immersed, and passing a pulse of welding current between said electrodes across the immersed surface portions.

3. A resistance welder adapted to receive between an upper movable electrode and a lower fixed electrode workpieces of aluminum having a film of aluminum oxide thereon and having a larger lower member with an upper surface portion to be welded to a surface portion of a smaller upper member, comprising pressure applying means connected to said movable electrode for biasing said movable electrode towards said fixed electrode and gripping said workpieces between said electrodes, a container forming continuous, unbroken side walls encircling said upper electrode and the said surface portions of said workpiece, arms supporting said container forming walls from said upper electrode and electrically insulating said container forming walls from said upper electrode, said container forming side walls having a resilient lower edge making liquid retaining engagement with said workpieces, a bath of etching solution in said container covering the said surface portions of said workpieces for deoxidizing said portions and preventing further oxidation, and current generating means connected across said electrodes for passing a pulse of weld current through said immersed workpieces.

References Cited by the Examiner

UNITED STATES PATENTS

| | | | |
|---|---|---|---|
| 1,055,261 | 3/13 | Ellinger | 219—72 |
| 2,194,573 | 3/40 | Schulz | 219—86 |
| 2,681,402 | 6/54 | Muller | 219—74 |
| 2,829,236 | 4/58 | Miles | 219—74 |
| 2,977,458 | 3/61 | Tournaire et al. | 219—118 |
| 2,990,467 | 6/61 | Rindy | 219—117 |
| 3,098,928 | 7/63 | Wagner | 219—78 |
| 3,108,176 | 10/63 | Simon | 219—74 |

RICHARD M. WOOD, *Primary Examiner.*